United States Patent
Wang et al.

(10) Patent No.: US 11,284,423 B2
(45) Date of Patent: Mar. 22, 2022

(54) METHODS, USER EQUIPMENT AND BASE STATION FOR PROCESSING SCHEDULING REQUEST

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 16/319,962

(22) PCT Filed: Dec. 20, 2018

(86) PCT No.: PCT/EP2018/086235
§ 371 (c)(1),
(2) Date: Jan. 23, 2019

(87) PCT Pub. No.: WO2019/154551
PCT Pub. Date: Aug. 15, 2019

(65) Prior Publication Data
US 2020/0084790 A1    Mar. 12, 2020

(30) Foreign Application Priority Data
Feb. 10, 2018    (WO) ............... PCT/CN2018/076111

(51) Int. Cl.
*H04W 72/12*   (2009.01)
*H04W 74/08*   (2009.01)
*H04W 72/10*   (2009.01)

(52) U.S. Cl.
CPC ....... *H04W 72/1284* (2013.01); *H04W 72/10* (2013.01); *H04W 74/0833* (2013.01)

(58) Field of Classification Search
CPC ............. H04W 72/1284; H04W 72/10; H04W 74/0833
See application file for complete search history.

(56) References Cited

U.S. PATENT DOCUMENTS

2013/0301541 A1* 11/2013 Mukherjee ........ H04W 74/0833
                                                        370/329
2014/0056243 A1*  2/2014 Pelletier .............. H04W 52/365
                                                        370/329

(Continued)

FOREIGN PATENT DOCUMENTS

EP      3275266 A1    1/2018
WO   2017140349 A1   8/2017

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.0.0, Dec. 2017, 1-55.

(Continued)

*Primary Examiner* — Huy D Vu
*Assistant Examiner* — Bailor C. Hsu
(74) *Attorney, Agent, or Firm* — Sage Patent Group (57) ABSTRACT

Methods, a user equipment (UE) and a base station are disclosed for processing scheduling request (SR). According to an embodiment, a random access procedure is performed for one or more first pending SRs in response to a first event. One or more physical uplink control channel (PUCCH) based SR transmission procedures are performed for one or more second pending SRs in response to a second event. The random access procedure is performed in parallel with the one or more PUCCH based SR transmission procedures.

14 Claims, 8 Drawing Sheets

(56) References Cited

U.S. PATENT DOCUMENTS

| | | | |
|---|---|---|---|
| 2015/0016350 A1* | 1/2015 | Moulsley | H04W 72/0453 |
| | | | 370/329 |
| 2018/0014322 A1* | 1/2018 | Loehr | H04W 52/0206 |
| 2019/0053170 A1* | 2/2019 | Lee | H04B 7/0617 |
| 2019/0103954 A1* | 4/2019 | Lee | H04W 72/042 |
| 2019/0104554 A1* | 4/2019 | Amuru | H04W 72/042 |
| 2019/0132110 A1* | 5/2019 | Zhou | H04L 5/0094 |
| 2019/0132857 A1* | 5/2019 | Babaei | H04W 72/042 |
| 2019/0132862 A1* | 5/2019 | Jeon | H04L 5/0064 |
| 2019/0182870 A1* | 6/2019 | Shih | H04W 16/32 |
| 2019/0191464 A1* | 6/2019 | Loehr | H04W 28/0278 |

OTHER PUBLICATIONS

Unknown, Author, "Discussion on SR Triggering and Cancellation", InterDigital Inc., 3GPP TSG-RAN WG2 NR AH#3, R2-1800518, Vancouver, Canada, Jan. 22-26, 2018, 1-4.

Unknown, Author, "Further enhancement to the SR failure handling for multiple pending SRs", Ericsson, 3GPP TSG-RAN WG2 #100, R2-1713481, Reno, Nevada, USA, Nov. 27-Dec. 1, 2017, 1-5.

Unknown, Author, "Remaining issues for Scheduling Request", Ericsson, 3GPP TSG-RAN WG2 #99bis, R2-1711178, Prague, Czech Republic, Oct. 9-13, 2017, 1-9.

First Examination Report dated Oct. 29, 2020 for Indian Patent Application No. 201917002291, 7 pages.

3GPP, "3rd Generation Partnership Project; Technical Specification Group Radio Access Network; NR; Medium Access Control (MAC) protocol specification (Release 15) 3GPP TS 38.321 V15.3.0", 3GPP TS 38.321 V15.3.0, Sep. 2018, pp. 1-76.

Unknown, Author, "Draft LS to RAN1 on handling parallel RA procedure and SR procedure", 3GPP TSG-RAN WG2 Meeting #101, R2-1802589, Athens, Greece, Feb. 26-Mar. 2, 2018, p. 1.

Unknown, Author, "Email discussion [101 bis#73][NR UP] Parallel SR and RACH", 3GPP TSG RAN WG2 Meeting 102, R2-1807264, Busan, Korea, May 21-25, 2018, pp. 1-16.

Unknown, Author, "Issues with parallel RACH and SR", 3GPP TSG-RAN WG2 Meeting #101, R2-1802492, Athens, Greece, Feb. 26-Mar. 2, 2018, pp. 1-3.

Unknown, Author, "On parallel SR and RACH procedure in NR", 3GPP TSG-RAN WG2 Meeting #101Bis, R2-1806164, Sanya, China, Apr. 16-20, 2018, pp. 1-7.

\* cited by examiner

METHODS, USER EQUIPMENT AND BASE STATION FOR PROCESSING SCHEDULING REQUEST

TECHNICAL FIELD

Embodiments of the disclosure generally relate to wireless communication, and, more particularly, to methods, a user equipment and a base station for processing scheduling request.

BACKGROUND

This section introduces aspects that may facilitate better understanding of the present disclosure. Accordingly, the statements of this section are to be read in this light and are not to be understood as admissions about what is in the prior art or what is not in the prior art.

In 3rd generation partnership project (3GPP) technical specification (TS) 38.321-f00, scheduling request (SR) is used for requesting uplink shared channel (UL-SCH) resources for new transmission. The medium access control (MAC) entity of a user equipment (UE) may be configured with zero, one, or more SR configurations. An SR configuration comprises a set of physical uplink control channel (PUCCH) resources for SR transmission across different bandwidth parts (BWPs) and cells. For a logical channel, at most one PUCCH resource for SR is configured per BWP. The BWP is introduced within a carrier because new radio (NR) system can have large carrier bandwidth but a UE may either be unable to support such a large carrier bandwidth or not need such a large carrier bandwidth due to low rate service. Sometimes a UE may be required to switch the BWP.

Each SR configuration corresponds to one or more logical channels (LCHs). Each logical channel may be mapped to zero or one SR configuration, which is configured by radio resource control (RRC) entity. The SR configuration of the LCH that triggers a buffer status report (BSR) (subclause 5.4.5) (if such a configuration exists) is considered as the corresponding SR configuration for the triggered SR. For a BSR triggered by retxBSR-Timer expiry, the corresponding SR configuration for the triggered SR is that of the highest priority LCH (if such a configuration exists) that has data available for transmission at the time the BSR is triggered.

The RRC configures the following parameters for the scheduling request procedure: sr-ProhibitTimer (per SR configuration), sr-TransMax (per SR configuration), and sr-ConfigIndex. The following UE variable is used for the scheduling request procedure: SR_COUNTER (per SR configuration). If an SR is triggered and there are no other SRs pending corresponding to the same SR configuration, the MAC entity shall set the SR_COUNTER of the corresponding SR configuration to 0. When an SR is triggered, it shall be considered as pending until it is cancelled. All pending SR(s) shall be cancelled and each respective sr-Prohibit-Timer shall be stopped when an MAC protocol data unit (PDU) is assembled and this PDU includes a BSR which contains buffer status up to (and including) the last event that triggered a BSR (see subclause 5.4.5 of 3GPP TS 38.321-f00), or when the UL grant(s) can accommodate all pending data available for transmission.

Only PUCCH resources on a BWP which is active at the time of SR transmission occasion are considered valid. Below is the corresponding description in 3GPP TS 38.321-f00:

As long as at least one SR is pending, the MAC entity shall for each pending SR:
1> if the MAC entity has no valid PUCCH resource configured for the pending SR:
   2> initiate a Random Access procedure (see subclause 5.1) on the SpCell and cancel the pending SR.
1> else, for the SR configuration corresponding to the pending SR:
   2> when the MAC entity has an SR transmission occasion on the valid PUCCH resource for SR configured; and
   2> if sr-ProhibitTimer is not running at the time of the SR transmission occasion; and
   2> if the PUCCH resource for the SR transmission occasion does not overlap with a measurement gap; and
   2> if the PUCCH resource for the SR transmission occasion does not overlap with a UL-SCH resource:
      3> if SR_COUNTER<sr-TransMax:
         4> increment SR_COUNTER by 1;
         4> instruct the physical layer to signal the SR on one valid PUCCH resource for SR;
         4> start the sr-ProhibitTimer.
      3> else:
         4> notify RRC to release PUCCH for all serving cells;
         4> notify RRC to release SRS for all serving cells;
         4> clear any configured downlink assignments and uplink grants;
         4> initiate a Random Access procedure (see subclause 5.1) on the SpCell and cancel all pending SRs.

NOTE: The selection of which valid PUCCH resource for SR to signal SR on when the MAC entity has more than one overlapping valid PUCCH resource for the SR transmission occasion is left to UE implementation.

As a summary, the SR on a PUCCH (also referred to as PUCCH-SR hereinafter) is repeatedly transmitted on consecutive SR opportunities on the PUCCH until the UE receives an UL grant on physical downlink control channel (PDCCH). The SR transmission on the PUCCH is stopped at least when PUCCH resources are released and/or UL synch is lost even if the UE has not received any UL grant on PDCCH. After stopping transmission on the PUCCH-SR, the UE transmits on random access channel (RACH) (also referred to as RACH-SR hereinafter). In this case, the UE already has a valid cell-radio network temporary identifier (C-RNTI). The UE would include the C-RNTI in message 3 for contention resolution purpose.

Regarding the BWP mentioned above, it is being under specified in RAN1, serving two purposes. On one hand, it enables power savings at the UE since the UE does not need to monitor the full bandwidth for control channels (e.g., control resource set, simply referred to as CORESET) all the time. On the other hand, it gives means for the network to perform an efficient radio resource management across the wide bandwidth via reallocating the operation frequency range of a UE.

From RAN1 #90, there are agreements regarding the signaling means for activation/deactivation of BWPs, which are highlighted as below:
   There is an initial active downlink/uplink (DUUL) bandwidth part pair to be valid for a UE until the UE is explicitly (re)configured with bandwidth part(s) during or after RRC connection is established.
   The initial active DL/UL bandwidth part is confined within the UE minimum bandwidth for the given frequency band.

For further study (FFS): details of initial active DL/UL bandwidth part are discussed in initial access agenda.

Activation/deactivation of DL and UL bandwidth part is supported by explicit indication at least in (FFS: scheduling) downlink control information (DCI).

FFS: In addition, MAC control element (CE) based approach is supported.

Activation/deactivation of DL bandwidth part is supported by means of timer for a UE to switch its active DL bandwidth part to a default DL bandwidth part.

The default DL bandwidth part can be the initial active DL bandwidth part defined above.

FFS: The default DL bandwidth part can be reconfigured by the network.

FFS: detailed mechanism of timer-based solution (e.g. introducing a new timer or reusing discontinuous reception (DRX) timer).

FFS: other conditions to switch to default DL bandwidth part.

The development of the BWP concept is started for DL. In RAN1 #90, RAN1 has made a solid progress on the single UL active BWP case. It is FFS for multiple active UL BWPs. For instance. RAN2 has made below agreements up to now for single BWP case:

1. For the single-cell case, one single LCH is mapped to none or one SR configuration per BWP.
2. sr-ProhibitTimer is independently configured per SR configuration.
3. drs-TransMax is independently configured per SR configuration.

Regarding the PUCCH mentioned above, it may have two formats in NR. The short PUCCH format comprises 1-2 symbols. However, if more time resources are available, a long PUCCH format can have a duration of 4-14 symbols. These two PUCCH formats are being discussed in RAN1. They can be applied for LCHs with different latency requirements respectively. For example, the short PUCCH format is of high relevance for ultra reliable & low latency communication (URLLC) like services.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for processing SR.

According to one aspect of the disclosure, there is provided a method implemented at a UE. The method comprises performing a random access procedure for one or more first pending SRs in response to a first event. The method further comprises performing one or more PUCCH based SR transmission procedures for one or more second pending SRs in response to a second event. The random access procedure is performed in parallel with the one or more PUCCH based SR transmission procedures.

In an embodiment of the disclosure, the first pending SR is associated with a first SR configuration and the second pending SR is associated with a second SR configuration. The second SR configuration is different than the first SR configuration. Alternatively, the first pending SR corresponds to a first set of logical channels and the second pending SR corresponds to a second set of logical channels. The second set is different than the first set. Alternatively, the first pending SR is triggered by a first logical channel having a first priority and the second pending SR is triggered by a second logical channel having a second priority. The second priority is higher than the first priority.

In an embodiment of the disclosure, performing the random access procedure for the one or more first pending SRs comprises indicating to a base station information about SR configuration(s) or logical channel(s) which meet the criteria for triggering of the random access procedure for the one or more first pending SRs.

In an embodiment of the disclosure, the first event is one of: there is no valid PUCCH resource in the corresponding SR configuration(s); and the maximum number of PUCCH based SR transmission attempts has been reached in the corresponding SR configuration(s).

In an embodiment of the disclosure, the information is indicated to the base station through physical random access channel (PRACH) resource on which message 1 is transmitted. Each PRACH resource is predefined to be associated with a corresponding SR configuration or logical channel. Alternatively, the information is indicated to the base station through message 3.

In an embodiment of the disclosure, the information indicated to the base station through message 3 is one of: none MAC CE carrying index(es) of the SR configuration(s) or logical channel(s); an MAC subheader which corresponds to an MAC CE without payload and indicates the presence of the SR configuration(s) or logical channel(s); a BSR including at least buffer status for the logical channel(s); and a RRC message carrying index(es) of the SR configuration(s) or logical channel(s).

In an embodiment of the disclosure, performing the random access procedure for the one or more first pending SRs comprises, in response to the first event occurring in currently active first BWP configured with no PRACH resource, switching to a second BWP configured with PRACH resource. Performing the random access procedure for the one or more first pending SRs further comprises performing the random access procedure in the second BWP. The method further comprises switching back to the first BWP.

In an embodiment of the disclosure, the first BWP is a non-default BWP and the second BWP is a default BWP.

In an embodiment of the disclosure, the method further comprises receiving from a base station a BWP switch command that instructs the UE to switch from a first BWP to a second BWP. The method further comprises, when the first BWP is configured with valid PUCCH resource for the one or more first pending SRs and the second BWP is configured with PRACH resource but with no PUCCH resource for the one or more first pending SRs, switching to the second BWP according to the BWP switch command. Performing the random access procedure for the one or more first pending SRs comprises, in response to the first event occurring in the second BWP, performing the random access procedure in the second BWP. Performing one or more PUCCH based SR transmission procedures for one or more second pending SRs comprises, in response to the second event occurring in the second BWP, performing the one or more PUCCH based SR transmission procedures in the second BWP.

In an embodiment of the disclosure, the random access procedure is started immediately after the switching to the second BWP. Alternatively, the random access procedure is started at a next SR opportunity based on an SR configuration which is associated with the one or more first pending SRs and active in the first BWP, but not active in the second BWP.

In an embodiment of the disclosure, the method further comprises receiving from a base station a BWP switch command that instructs the UE to switch from a first BWP to a second BWP. The method further comprises, when the first BWP is configured with valid PUCCH resource for the one or more first pending SRs and the second BWP is configured with no PRACH and no PUCCH resource for the one or more first pending SRs, switching to a third BWP configured with PRACH resource. Performing the random access procedure for the one or more first pending SRs comprises, in response to the first event occurring in the third BWP, performing the random access procedure in the third BWP. The method further comprises switching to the second BWP.

According to another aspect of the disclosure, there is provided a method implemented at a base station. The method comprises performing a first resource allocation procedure in response to reception of a resource allocation request related to random access procedure from a UE. The resource allocation request is triggered for one or more first pending SRs on the UE which have no PUCCH resource to use. The method further comprises performing a second resource allocation procedure in response to reception of one or more second SRs on PUCCH from the UE. The first resource allocation procedure is performed in parallel with the second resource allocation procedure.

In an embodiment of the disclosure, performing the first resource allocation procedure comprises determining what logical channel(s) request an uplink grant, based on the resource allocation request. Performing the first resource allocation procedure further comprises allocating uplink resource for the determined logical channel(s).

In an embodiment of the disclosure, the resource allocation request is message 1, and the logical channel(s) are determined based on PRACH resource on which the message 1 is transmitted. Each PRACH resource is predefined to be associated with a corresponding logical channel. Allocating uplink resource for the determined logical channel(s) comprises one of or a combination of: transmitting to the UE a random access response message including an uplink grant sufficient for transmission of information about the one or more first pending SRs; transmitting to the UE a random access response message including an uplink grant sufficient for transmission of traffic data for the determined logical channel(s); and reconfiguring the UE with PUCCH resource for the determined logical channel(s).

According to another aspect of the disclosure, there is provided a UE. The UE comprises a processor and a memory. The memory contains instructions executable by the processor, whereby the UE is operative to perform a random access procedure for one or more first pending SRs in response to a first event. The UE is further operative to perform one or more PUCCH based SR transmission procedures for one or more second pending SRs in response to a second event. The random access procedure is performed in parallel with the one or more PUCCH based SR transmission procedures.

In an embodiment of the disclosure, the UE is operative to perform the method according to the above aspect.

According to another aspect of the disclosure, there is provided a base station. The base station comprises a processor and a memory. The memory contains instructions executable by the processor, whereby the base station is operative to perform a first resource allocation procedure in response to reception of a resource allocation request related to random access procedure from a UE. The resource allocation request is triggered for one or more first pending SRs on the UE which have no PUCCH resource to use. The base station is further operative to perform a second resource allocation procedure in response to reception of one or more second SRs on PUCCH from the UE. The first resource allocation procedure is performed in parallel with the second resource allocation procedure.

In an embodiment of the disclosure, the base station is operative to perform the method according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a UE. The UE comprises a first performing module for performing a random access procedure for one or more first pending SRs in response to a first event. The UE further comprises a second performing module for performing one or more PUCCH based SR transmission procedures for one or more second pending SRs in response to a second event. The random access procedure is performed in parallel with the one or more PUCCH based SR transmission procedures.

According to another aspect of the disclosure, there is provided a base station. The base station comprises a first performing module for performing a first resource allocation procedure in response to reception of a resource allocation request related to random access procedure from a UE. The resource allocation request is triggered for one or more first pending SRs on the UE which have no PUCCH resource to use. The base station further comprises a second performing module for performing a second resource allocation procedure in response to reception of one or more second SRs on PUCCH from the UE. The first resource allocation procedure is performed in parallel with the second resource allocation procedure.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, in the current technical specification of SR procedure, it is specified that (some steps are omitted for brevity):
as long as at least one SR is pending, the MAC entity shall for each pending SR:
1> if the MAC entity has no valid PUCCH resource configured for the pending SR:
    2> initiate a Random Access procedure (see subclause 5.1) on the SpCell and cancel the pending SR;
1> else, for the SR configuration corresponding to the pending SR:
    3> if SR_COUNTER<sr-TransMax:
        4> instruct the physical layer to signal the SR on one valid PUCCH resource for SR;
    3> else:
        4> initiate a Random Access procedure (see subclause 5.1) on the SpCell and cancel all pending SRs.

According to the above text, the UE initiates a random access procedure on the SpCell, if there is no valid PUCCH resource configured for a pending SR, or if the maximum number of PUCCH-SR transmission attempts has been reached in the corresponding SR configuration. However, the current technical specification does not pay attention to the following problems.

For example, in a first case, a UE MAC has no valid PUCCH resource for one pending SR in the current active BWP. The pending SR is associated with one SR configuration, which is mapped to multiple LCHs. The pending SR may be triggered by one of these LCHs, such as a LCH carrying enhanced mobile broadband (eMBB) traffic. The UE MAC would then start a random access procedure (RACH-SR procedure) for the eMBB traffic and cancel the pending SR. However, the UE also has a SR pending for URLLC while the RACH-SR is initiated. The current technical specification does not define the UE behavior on whether the pending SR should be cancelled or kept as pending. If the UE MAC also cancels the SR for the URLLC, the URLLC would be delayed, since the RACH-SR may take a long time to finish. It is unfair for the URLLC traffic, since the URLLC is mapped to a different SR configuration/SR resource.

In a second case, a UE MAC receives a BWP switch command, while there is a pending SR for URLLC in the old BWP, and there is no PUCCH resource configured for the URLLC in the new BWP. The current technical specification allows the UE to perform RACH-SR and cancel the pending SR for the URLLC after the BWP switch. However, after the BWP switch, there may be a new SR triggered for critical machine-type communication (MTC) in the new BWP. The current technical specification does not define the UE behavior on whether the pending SR for the critical MTC should be cancelled or kept as pending, so that a PUCCH-SR can be triggered.

Therefore, it would be advantageous to enhance the current SR procedure for NR by focusing on how to handle the interaction between RACH-SR and PUCCH-SR. For example, the focus may be on the two questions. The first question may be described as: when a RACH-SR is triggered for an SR configuration since there is no valid PUCCH resource for pending PUCCH-SRs, shall the UE cancel pending SRs triggered by other SR configurations? The second question may be described as: when a RACH-SR procedure is running, is the UE allowed to send PUCCH-SR for other SR configurations that have valid PUCCH resources?

The present disclosure proposes a series of solutions for processing SR. These solutions may be applied to a wireless communication system including a UE and a base station. The UE can communicate through a radio access communication link with the base station. The base station can provide radio access communication links to UEs that are within its communication service cell. The base station may be, for example, a gNB in NR. Note that the communications may be performed between the UE and the base station according to any suitable communication standards and protocols. The UE may also be referred to as, for example, mobile station, mobile unit, subscriber station, access terminal, terminal device, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 1A:
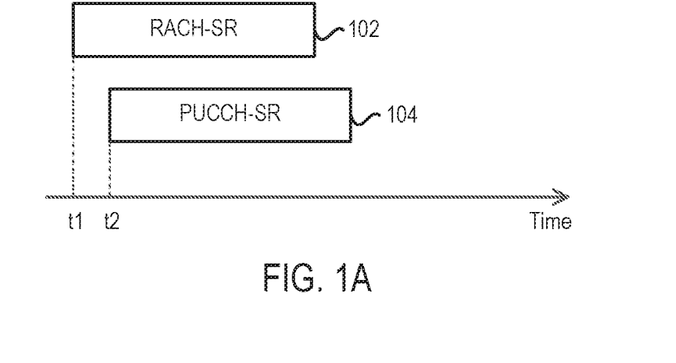
FIGS. 1A-IC are diagrams illustrating the first embodiment of the disclosure.
Figure 1B:
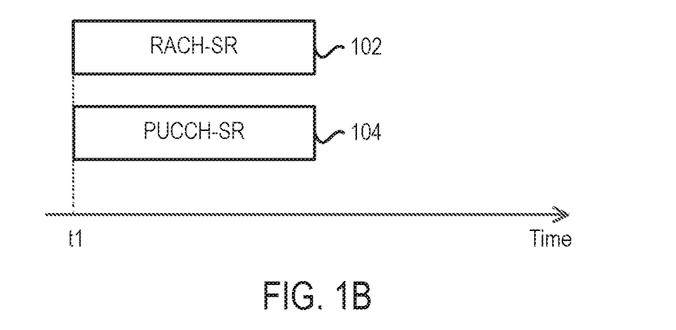
Figure 1C:
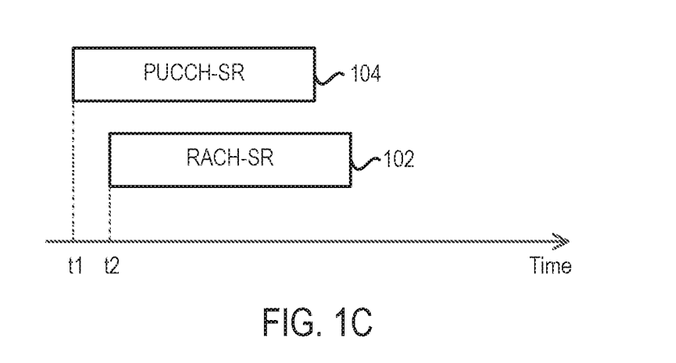

Hereinafter, the solutions will be described in detail with reference to FIGS. 1-12. FIGS. 1A-1C are diagrams illustrating the first embodiment of the disclosure. In this embodiment, a UE MAC entity has no valid PUCCH resource for a pending SR corresponding to a logical channel in the current active BWP. The pending SR is associated with an SR configuration. The UE MAC entity starts a random access procedure (RACH-SR procedure) in response to the pending SR and cancels the corresponding pending SR accordingly. For example, as shown in FIG. 1A, the RACH-SR procedure 102 may be initiated at the time t1.

Meanwhile, if the UE also has pending SRs for other SR configurations that have valid PUCCH resources while the RACH-SR procedure is initiated, these pending SRs are not cancelled upon the RACH-SR procedure. That is, PUCCH-SRs can be transmitted/triggered in parallel with the RACH- SR procedure regardless of the priorities of the SR configurations, and what LCHs have triggered the SRs. For example, as shown in FIG. 1A, the PUCCH-SR procedure 104 may be initiated at the time t2 such that these two procedures 102 and 104 are performed in parallel. The term "in parallel" means that the two procedures may overlap at least partly along the time axis. Note that for the purpose of brevity, only one PUCCH-SR procedure 104 is shown in FIG. 1A. Also note that the two procedures may last different time lengths with each other although the same time length is shown for illustration purpose.

As shown in FIG. 1B, it is also possible that the RACH-SR procedure 102 and the PUCCH-SR procedure 104 are initiated simultaneously. Furthermore, as shown in FIG. 1C, it is also possible that the PUCCH-SR procedure 104 is initiated before the RACH-SR procedure 102.

In the second embodiment, only the parallel RACH-SR procedure and PUCCH-SR procedure that belong to different SR configurations or correspond to different set of logical channels are allowed. In this way, the potential risk of the SR overload can be restricted when RACH-SRs and PUCCH-SRs can be triggered or transmitted in parallel. Optionally, a priority level may be determined for each RACH-SR or PUCCH-SR. For example, the priority may be determined in terms of the priorities of the LCHs mapped with the SR configuration that has triggered the SR. Assume that three LCHs are mapped with the SR configuration that has triggered the SR. Then, the priority of the highest priority LCH among the three LCHs may be determined as the priority of the corresponding RACH-SR or PUCCH-SR procedure. However, the present disclosure is not limited to this example and the priority may be determined in any other suitable manner. For example, an average value of the priorities of the LCHs may be used instead.

As an application example for the priority, a RACH-SR procedure triggered by a logical channel may be initiated simultaneously with a PUCCH-SR procedure associated with another logical channel of higher priority. In this way, a RACH-SR procedure triggered by eMBB would not cancel pending PUCCH-SRs triggered by URLLC.

In the third embodiment, different from the existing procedure, the RACH-SR procedure is improved to carry information to indicate what SR configuration or what LCHs are associated with this RACH-SR procedure. As a first alternative, the information may be carried based on message 1. Specifically, the RACH-SR procedure may use different PRACH resource/configuration from the normal ones. The network may configure different PRACH resource/configuration for each SR configuration or LCH or LCH group, for the purpose of RACH-SR triggering in case there is no available PUCCH-SR resource for them. Correspondingly, the base station (e.g., gNB) can determine what logical channels are requesting UL grant based on the PRACH resource on which the message 1 is transmitted.

As a second alternative, the information may be carried by a new MAC CE in message 3. This new MAC CE may be defined with several options. As a first option, the new MAC CE may carry one or several indices of the SR configurations which have triggered pending SRs. As a second option, the new MAC CE may carry one or several indices of the LCHs which have triggered pending SRs. As a third option, the new MAC CE does not carry any index. That is, it has no payload but there is a corresponding MAC subheader indicating the presence of the SR configurations or logical channels that meet the criteria for triggering of the RACH-SR. Upon reception of this MAC subheader, the network may figure out what SR configurations may trigger pending SRs. For example, those SR configurations may be the ones that have no PUCCH resources configured.

As a third alternative, the information may be carried by an existing MAC CE (e.g., BSR) in message 3. The BSR may comprise the buffer status for the LCHs which have triggered pending SRs. Optionally, the BSR may comprise the buffer status for all LCHs that have data available for transmission. As a fourth alternative 4, the information on pending SRs may be carried in RRC message in message 3. For example, new RRC information elements may be defined in case RRC message carries the information.

Figure 2:
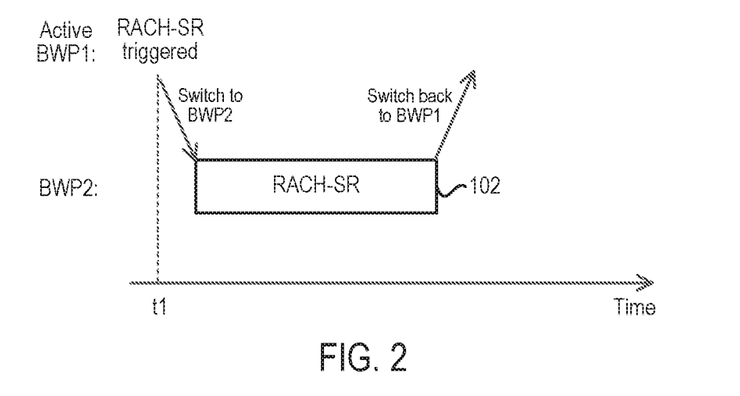
FIG. 2 is a diagram illustrating the fourth embodiment of the disclosure.

In the fourth embodiment, as shown in FIG. 2, when a RACH-SR procedure is triggered but there is no PRACH resource configured in the active first (e.g., non-default) BWP, the UE may switch to a second BWP (e.g., the default BWP) configured with PRACH resource, to perform the RACH-SR procedure. After performing the RACH-SR procedure, the UE may switch back to the original first (e.g., non-default) BWP.

In the fifth embodiment, in case of BWP switch, there is not any PUCCH-SR configuration/resource available for pending SRs (which were triggered by some LCHs when the UE is served in the old BWP) in the target BWP, but there is PRACH configuration/resource available in the target BWP. At the same time, there may be PUCCH-SR configuration/resource available in the target BWP for other LCHs. In this case, the pending SRs which were triggered when the UE is served in the old BWP are not cancelled upon the BWP switch occurs. That is, after the BWP switch, those pending SRs which has no valid PUCCH resource in the target BWP are remained pending. A random access procedure (RACH-SR procedure) in the target BWP is started for these pending SRs. The RACH-SR procedure may start immediately after the BWP switch, or at a next SR opportunity which is supposed to be triggered for the SR configuration that is associated with those pending SRs but is not active in the new BWP.

Meanwhile, since there may be SRs triggered by SR configurations/resources which are available in the new BWP, the parallel triggering of RACH-SR procedure and PUCCH-SR procedure can be allowed. In other words, the RACH-SR procedure does not cancel the PUCCH-SR procedures for existing SR configurations which are not associated with the RACH-SR procedure. In such a way, there may be parallel RACH-SR procedure and PUCCH-SR procedure in the same BWP. For example, as mentioned in the second embodiment, the PUCCH-SR procedure may be triggered by a LCH with higher priority. In this case, the parallel RACH-SR and PUCCH-SR procedures can make it possible to avoid the interruption for services with critical quality of service (QoS) requirements during BWP switch.

Figure 3:
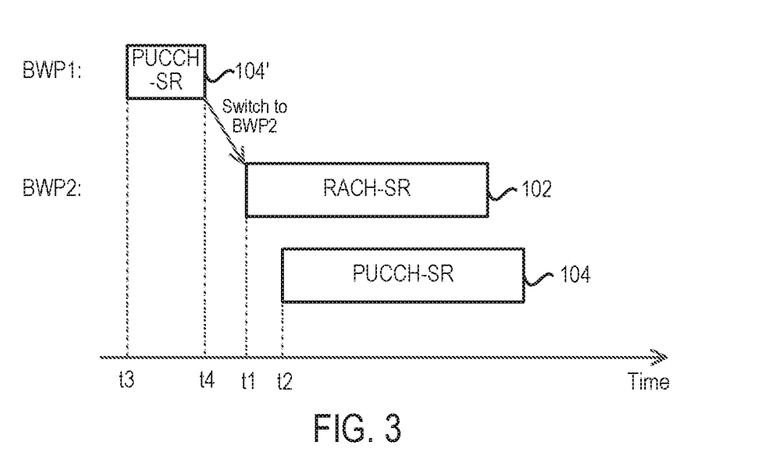
FIG. 3 is a diagram illustrating the fifth embodiment of the disclosure.

For example, as shown in FIG. 3, a PUCCH-SR procedure 104' is triggered for first pending SRs in BWP1 at the time t3. Then, at the time t4, the UE receives a BWP switch command for switching from the BWP1 to BWP2. The BWP2 is configured with no PUCCH resource for the first pending SRs, but with PRACH resource. According to the BWP switch command, the UE switches to the BWP2. Suppose the switching finishes at the time t1. Then, a RACH-SR procedure 102 may be triggered at the time t1 for the first pending SRs in the BWP2. Alternatively, suppose the switching finishes before the time t1. Then, if the SR configuration associated with the first pending SRs and active in the BWP1 indicates that the next SR should be transmitted at the time t1, the RACH-SR procedure 102 may be triggered at the time t1.

Meanwhile, the BWP2 may be configured with PUCCH resource for second SRs. Thus, a PUCCH-SR procedure 104 may be triggered at the time t2 for the second SRs in the BWP2. As a result, two procedures 102 and 104 are performed in parallel in the BWP2.

In the sixth embodiment, there is not any PUCCH-SR configuration/resource available for pending SRs (which were triggered by some LCHs in the old BWP) in the target BWP, but there are no PRACH configuration/resource available in the target BWP. Upon reception of a BWP switch command, the UE may first switch to another BWP (such as initial UL BWP) that has PRACH configuration/resource configured. The UE MAC initiates a random access procedure (RACH-SR procedure) in that BWP. For example, the RACH-SR procedure may carry information on the pending SRs in the old BWP, as described in the third embodiment. After the RACH-SR procedure, the UE may switch to the target BWP.

Figure 4:
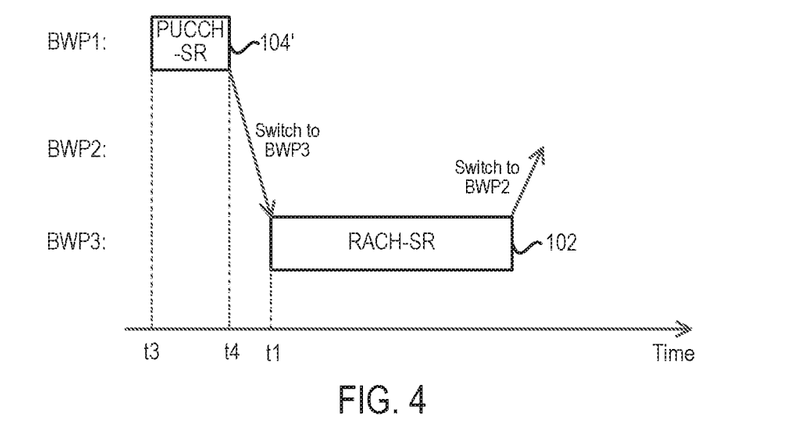
FIG. 4 is a diagram illustrating the sixth embodiment of the disclosure.

For example, as shown in FIG. 4, a PUCCH-SR procedure 104' is triggered for first pending SRs in BWP1 at the time t3. Then, at the time t4, the UE may receive a BWP switch command for switching from the BWP1 to BWP2. The BWP2 is configured with no PUCCH resource for the first pending SRs and with no PRACH resource. Thus, the UE switches to BWP3 configured with PRACH resource such that a RACH-SR procedure 102 is triggered at the time t1. Similar to the fifth embodiment, the time t1 may refer to the time at which the switching is finished, or the next SR opportunity which is based on the SR configuration associated with the first pending SRs and active in the BWP1. After performing the RACH-SR procedure 102, the UE switches to the BWP2.

In the seventh embodiment, upon reception of a RACH-SR request for pending SRs that have no PUCCH-SR resource to use, if the RACH-SR for pending SRs that have no PUCCH-SR resource to use is identified via message 1, the base station (e.g., gNB) may reply with a random access response (RAR) message which may optionally include a grant sufficient for transmission of information on the pending SRs.

Optionally, the base station may reconfigure the UE with PUCCH-SR resources for LCHs that triggered the pending SRs, but have no PUCCH resources to use. Optionally, the base station may provide in the RAR message grants that are sufficient for transmission of the data for the LCHs that triggered the pending SRs. In this case, it is possible that there is no new PUCCH resource reconfigured for those LCHs.

Figure 5:
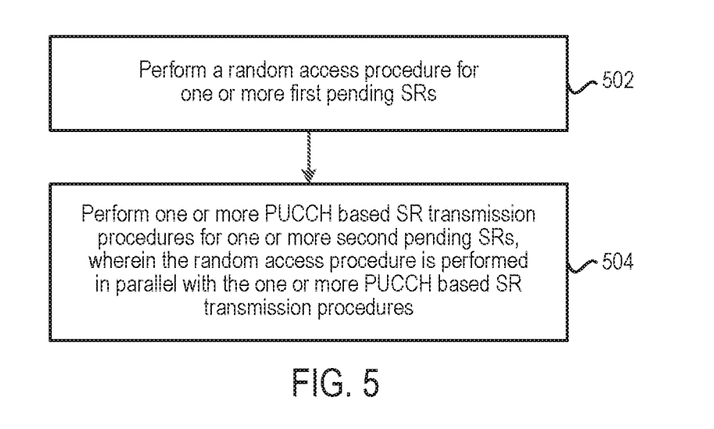
FIG. 5 is a flowchart illustrating a method implemented at a UE according to an embodiment of the disclosure.

FIG. 5 is a flowchart illustrating a method implemented at a UE according to an embodiment of the disclosure. At block 502, a random access procedure is performed for one or more first pending SRs in response to a first event. As an example, the first event may be the event that there is no valid PUCCH resource in the SR configuration(s) associated with the one or more first pending SRs. As another example, the first event may be the event that the maximum number of PUCCH based SR transmission attempts has been reached in the SR configuration(s) associated with the one or more first pending SRs.

At block 504, one or more PUCCH based SR transmission procedures are performed for one or more second pending SRs in response to a second event. The random access procedure is performed in parallel with the one or more PUCCH based SR transmission procedures. For example, the second event may be the event that the one or more second pending SRs have valid PUCCH resource to use. The random access procedure and the PUCCH based SR transmission procedure may be performed in the same BWP, as described in the first, fourth, fifth and sixth embodiments. It is also possible that the two types of procedures are performed in different BWPs in case more than one active BWPs are supported for a UE.

Figure 6:
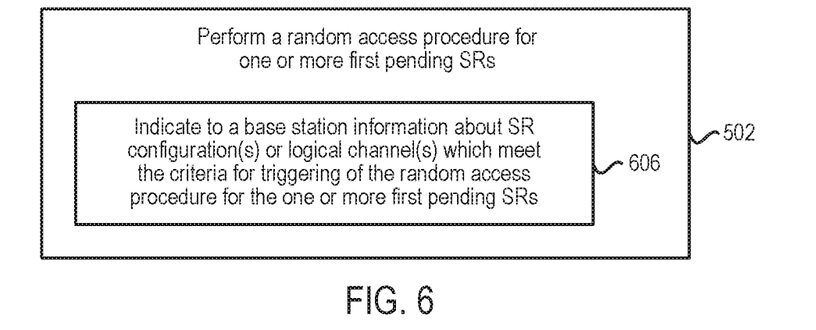
FIG. 6 is a flowchart illustrating a method implemented at a UE according to another embodiment of the disclosure.

FIG. 6 is a flowchart illustrating a method implemented at a UE according to another embodiment of the disclosure. As shown, in this embodiment, block 502 comprises block 606 at which the UE indicates to a base station information about SR configuration(s) or logical channel(s) which meet the criteria for triggering of the random access procedure for the one or more first pending SRs. The information may be indicated as described in the above third embodiment. Thus, its details are omitted here for brevity.

Figure 7:
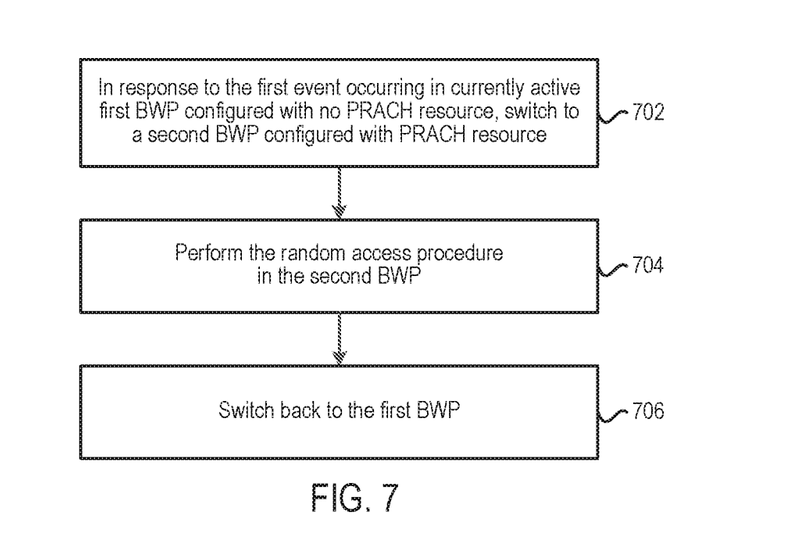
FIG. 7 is a flowchart illustrating a method implemented at a UE according to another embodiment of the disclosure.

FIG. 7 is a flowchart illustrating a method implemented at a UE according to another embodiment of the disclosure. At block 702, in response to the first event occurring in currently active first BWP configured with no PRACH resource, the UE switches to a second BWP configured with PRACH resource. At block 704, the random access procedure is performed in the second BWP. At block 706, the UE switches back to the first BWP. The details of blocks 702-706 have been described in the above fourth embodiment and thus are omitted here.

Figure 8:
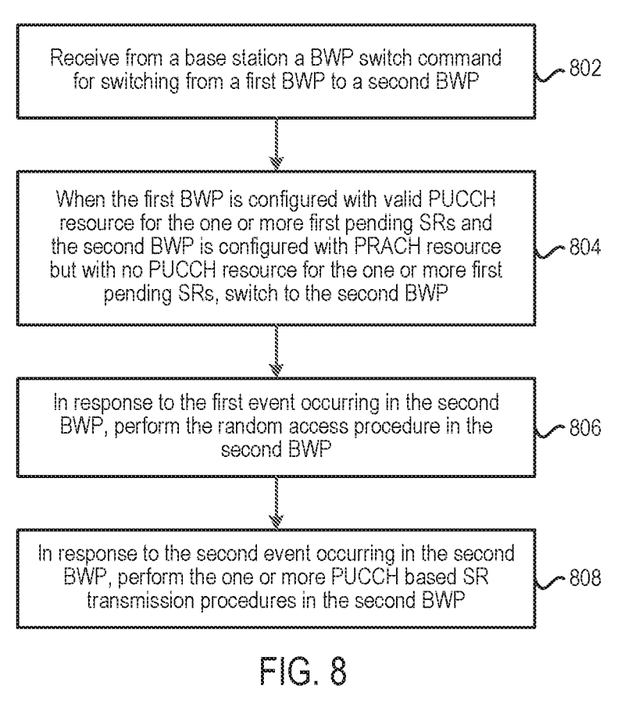
FIG. 8 is a flowchart illustrating a method implemented at a UE according to another embodiment of the disclosure.

FIG. 8 is a flowchart illustrating a method implemented at a UE according to another embodiment of the disclosure. At block 802, the UE receives from a base station a BWP switch command that instructs the UE to switch from a first BWP to a second BWP. At block 804, when the first BWP is configured with valid PUCCH resource for the one or more first pending SRs and the second BWP is configured with PRACH resource but with no PUCCH resource for the one or more first pending SRs, the UE switches to the second BWP according to the BWP switch command. At block 806, in response to the first event occurring in the second BWP, the random access procedure is performed in the second BWP. At block 808, in response to the second event occurring in the second BWP, the one or more PUCCH based SR transmission procedures are performed in the second BWP, such that the random access procedure is performed in parallel with the PUCCH based SR transmission procedures in the second BWP. The details of blocks 802-808 have been described in the above fifth embodiment and thus are omitted here.

Figure 9:
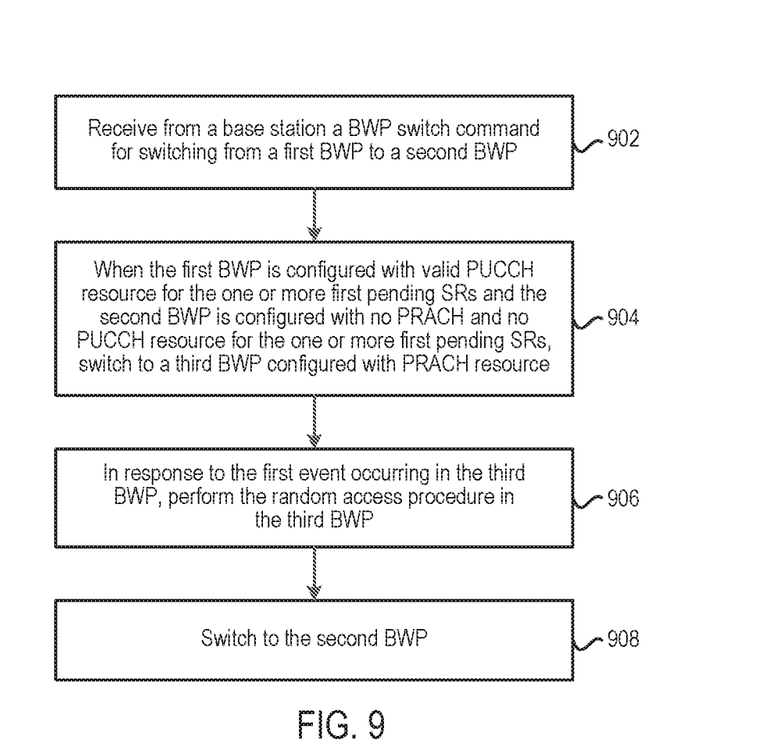
FIG. 9 is a flowchart illustrating a method implemented at a UE according to another embodiment of the disclosure.

FIG. 9 is a flowchart illustrating a method implemented at a UE according to another embodiment of the disclosure. At block 902, the UE receives from a base station a BWP switch command that instructs the UE to switch from a first BWP to a second BWP. At block 904, when the first BWP is configured with valid PUCCH resource for the one or more first pending SRs and the second BWP is configured with no PRACH and no PUCCH resource for the one or more first pending SRs, the UE switches to a third BWP configured with PRACH resource. At block 906, in response to the first event occurring in the third BWP, the random access procedure is performed in the third BWP. At block 908, the UE switches to the second BWP. The details of blocks 902-908 have been described in the above sixth embodiment and thus are omitted here.

Figure 10:
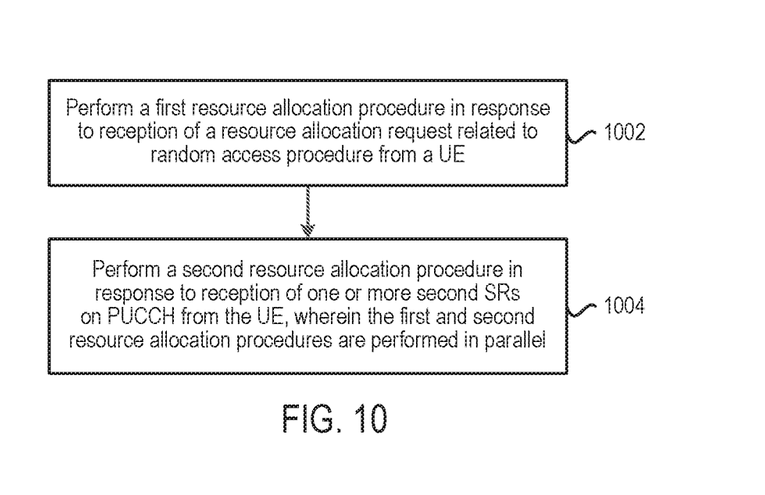
FIG. 10 is a flowchart illustrating a method implemented at a base station according to an embodiment of the disclosure.

FIG. 10 is a flowchart illustrating a method implemented at a base station according to an embodiment of the disclosure. At block 1002, a first resource allocation procedure is performed in response to reception of a resource allocation request related to random access procedure from a UE. The resource allocation request is triggered for one or more first pending SRs on the UE which have no PUCCH resource to use. The resource allocation request may be, for example, message 1 or message 3 in the random access procedure.

Figure 11:
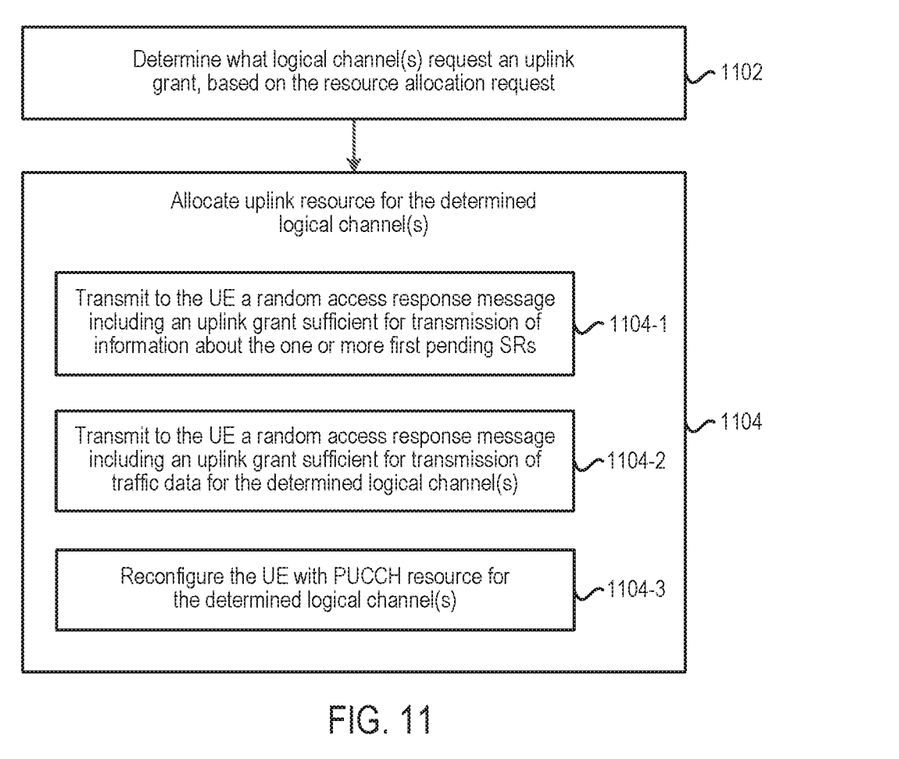
FIG. 11 is a flowchart for explaining the method of FIG. 10.

For example, block 1002 may be implemented as blocks 1102-1104 of FIG. 11. At block 1102, the base station determines what logical channel(s) request an uplink grant, based on the resource allocation request. In case the resource allocation request is message 1, the logical channel(s) may be determined based on PRACH resource on which the message 1 is transmitted. Each PRACH resource is predefined to be associated with a corresponding logical channel. In case the resource allocation request is message 3, the logical channel(s) may be determined according to the information carried in message 3, such as a MAC CE, a MAC subheader, a BSR, or a RRC message as described in the above third embodiment.

At block 1104, the base station allocates uplink resource for the determined logical channel(s). In case the resource allocation request is message 1, block 1104 may comprise at least one of blocks 1104-1, 1104-2 and 1104-3. At 1104-1, the base station transmits to the UE a random access response message including an uplink grant sufficient for transmission of information about the one or more first pending SRs. At block 1104-2, the base station transmits to the UE a random access response message including an uplink grant sufficient for transmission of traffic data for the determined logical channel(s). At block 1104-3, the base station reconfigures the UE with PUCCH resource for the determined logical channel(s).

Referring back to FIG. 10, at block 1004, a second resource allocation procedure is performed in response to reception of one or more second SRs on PUCCH from the UE. The first resource allocation procedure is performed in parallel with the second resource allocation procedure. Similar to the embodiment of FIG. 5, the term "in parallel" means that the two procedures may overlap at least partly along the time axis. It should be noted that two blocks shown in succession in the above figures may, in fact, be executed substantially concurrently, or the blocks may sometimes be executed in the reverse order, depending upon the functionality involved.

Figure 12:
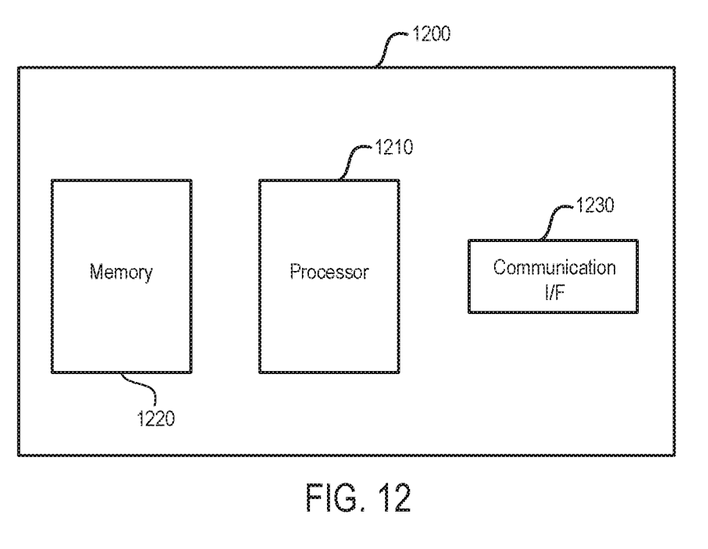
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the UE and the base station described above may be implemented through the apparatus 1200. As shown, the apparatus 1200 may include a processor 1210, a memory 1220 that stores a program, and a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

As another embodiment, the UE may comprise a first performing module and a second performing module. The first performing module may be configured to perform a random access procedure for one or more first pending SRs in response to a first event (block 502 in FIG. 5). The second performing module may be configured to perform one or more PUCCH based SR transmission procedures for one or more second pending SRs in response to a second event (block 504 in FIG. 5). The random access procedure is performed in parallel with the one or more PUCCH based SR transmission procedures.

As another embodiment, the base station may comprise a first performing module and a second performing module. The first performing module may be configured to perform a first resource allocation procedure in response to reception of a resource allocation request related to random access procedure from a UE (block 1002 in FIG. 10). The resource allocation request is triggered for one or more first pending SRs on the UE which have no PUCCH resource to use. The second performing module may be configured to perform a second resource allocation procedure in response to reception of one or more second SRs on PUCCH from the UE (block 1004 in FIG. 10). The first resource allocation procedure is performed in parallel with the second resource allocation procedure. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a user equipment (UE) the method comprising:
   performing a random access procedure for one or more first pending scheduling requests (SRs), in response to a first event; and
   performing one or more physical uplink control channel (PUCCH) based SR transmission procedures for one or more second pending SRs in response to a second event;
   wherein the random access procedure is performed in parallel with the one or more PUCCH based SR transmission procedures, wherein the method further comprises:
   receiving from a base station a bandwidth part (BWP) switch command that instructs the UE to switch from a first BWP to a second BWP; and
   when the first BWP is configured with valid PUCCH resource for the one or more first pending SRs and the second BWP is configured with physical random access channel (PRACH) resource but with no PUCCH resource for the one or more first pending SRs, switching to the second BWP according to the BWP switch command;
   wherein performing the random access procedure for the one or more first pending SRs comprises: in response to the first event occurring in the second BWP, performing the random access procedure in the second BWP, the first event is when there is no valid PUCCH resource in a corresponding SR configurations; and
   wherein performing one or more PUCCH based SR transmission procedures for one or more second pending SRs comprises: in response to the second event occurring in the second BWP, performing the one or more PUCCH based SR transmission procedures in the second BWP, while the random access procedure is ongoing, wherein the second event is an event when the one or more second pending SRs have valid PUCCH resources to use.

2. The method of claim 1, wherein the first pending SR is associated with a first SR configuration and the second pending SR is associated with a second SR configuration, the second SR configuration being different than the first SR configuration; or
   wherein the first pending SR corresponds to a first set of logical channels and the second pending SR corresponds to a second set of logical channels, the second set being different than the first set; or
   wherein the first pending SR is triggered by a first logical channel having a first priority and the second pending SR is triggered by a second logical channel having a second priority, the second priority being higher than the first priority.

3. The method of claim 1, wherein performing the random access procedure for the one or more first pending SRs comprises:
   indicating to a base station information about SR configuration(s) or logical channel(s) which meet a criterion for triggering of the random access procedure for the one or more first pending SRs.

4. The method of claim 3, wherein the information is indicated to the base station through physical random access channel (PRACH) resource on which message 1 is transmitted, each PRACH resource being predefined to be associated with a corresponding SR configuration or logical channel; or
   wherein the information is indicated to the base station through message 3.

5. The method of claim 4, wherein the information indicated to the base station through message 3 is one of:
   a medium access control (MAC) control element (CE) carrying index(es) of the SR configuration(s) or logical channel(s);
   a MAC subheader which corresponds to a MAC CE without payload and indicates the presence of the SR configuration(s) or logical channel(s);

a buffer status report (BSR) including at least buffer status for the logical channel(s); and a radio resource control (RRC) message carrying index(es) of the SR configuration(s) or logical channel(s).

6. The method of claim 1, wherein the first event is an event when a maximum number of PUCCH based SR transmission attempts has been reached in the corresponding SR configuration(s).

7. The method of claim 1, wherein the first BWP is a non-default BWP and the second BWP is a default BWP.

8. The method of claim 1, wherein the random access procedure is started immediately after the switching to the second BWP; or wherein the random access procedure is started at a next SR opportunity based on an SR configuration which is associated with the one or more first pending SRs and active in the first BWP, but not active in the second BWP.

9. The method of claim 1, further comprising:
receiving from a base station a bandwidth part (BWP) switch command that instructs the UE to switch from a first BWP to a second BWP; and
when the first BWP is configured with valid PUCCH resource for the one or more first pending SRs and the second BWP is configured with no physical random access channel (PRACH) and no PUCCH resource for the one or more first pending SRs, switching to a third BWP configured with PRACH resource;
wherein performing the random access procedure for the one or more first pending SRs comprises: in response to the first event occurring in the third BWP, performing the random access procedure in the third BWP; and
wherein the method further comprises switching to the second BWP.

10. The method of claim 1, wherein performing the random access procedure for the one or more first pending SRs comprises:
in response to the first event occurring in currently active first bandwidth part (BWP) configured with no PRACH resource, switching to a second BWP configured with PRACH resource; and
performing the random access procedure in the second BWP; and
wherein the method further comprises switching back to the first BWP.

11. A method implemented at a base station, the method comprising:
performing a first resource allocation procedure in response to reception of a resource allocation request related to random access procedure from a user equipment (UE), the resource allocation request being triggered for one or more first pending scheduling requests (SRs) on the UE which have no physical uplink control channel (PUCCH) resource to use; and
performing a second resource allocation procedure in response to reception of one or more second SRs on PUCCH from the UE;
wherein the first resource allocation procedure is performed in parallel with the
second resource allocation procedure, wherein performing the first resource allocation procedure comprises:
determining what logical channel(s) request an uplink grant, based on the resource allocation request; and
allocating uplink resource for the determined logical channel(s), wherein allocating uplink resource comprises reconfiguring the UE with PUCCH resources for the determined logical channels.

12. The method of claim 11, wherein the resource allocation request is message 1, and the logical channel(s) are determined based on physical random access channel (PRACH) resource on which the message 1 is transmitted, each PRACH resource being predefined to be associated with a corresponding logical channel; and
wherein allocating uplink resource for the determined logical channel(s) comprises one of or a combination of:
transmitting to the UE a random access response message including an uplink grant sufficient for transmission of information about the one or more first pending SRs; and
transmitting to the UE a random access response message including an uplink grant sufficient for transmission of traffic data for the determined logical channel(s).

13. A user equipment (UE) comprising:
a processor; and
a memory, the memory containing instructions executable by the processor,
whereby the UE is operative to:
perform a random access procedure for one or more first pending scheduling requests (SRs), in response to a first event; and
perform one or more physical uplink control channel (PUCCH) based SR transmission procedures for one or more second pending SRs in response to a second event;
wherein the random access procedure is performed in parallel with the one or more PUCCH based SR transmission procedures, wherein the UE is further operative to:
receive from a base station a bandwidth part (BWP) switch command that instructs the UE to switch from a first BWP to a second BWP; and
when the first BWP is configured with valid PUCCH resource for the one or more first pending SRs and the second BWP is configured with physical random access channel (PRACH) resource but with no PUCCH resource for the one or more first pending SRs, switching to the second BWP according to the BWP switch command;
wherein performing the random access procedure for the one or more first pending SRs comprises: in response to the first event occurring in the second BWP, performing the random access procedure in the second BWP; and
wherein performing one or more PUCCH based SR transmission procedures for one or more second pending SRs comprises: in response to the second event occurring in the second BWP, performing the one or more PUCCH based SR transmission procedures in the second BWP, while the random access procedure is ongoing, wherein the second event is an event when the one or more second pending SRs have valid PUCCH resources to use.

14. A base station comprising:
a processor; and
a memory, the memory containing instructions executable by the processor,
whereby the base station is operative to:
perform a first resource allocation procedure in response to reception of a resource allocation request related to random access procedure from a user equipment (UE) the resource allocation request being triggered for one or more first pending scheduling requests (SRs) on the UE which have no physical uplink control channel (PUCCH) resource to use; and perform a second resource allocation procedure in response to reception of one or more second SRs on PUCCH from the UE;

wherein the first resource allocation procedure is performed in parallel with the second resource allocation procedure, wherein in performing the first resource allocation procedure, the base station is further operative to:

determine what logical channel(s) request an uplink grant, based on the resource allocation request; and allocate uplink resource for the determined logical channel(s), wherein allocating uplink resource comprises reconfiguring the UE with PUCCH resources for the determined logical channels.

* * * * *